United States Patent [19]
Mor et al.

[11] Patent Number: 5,378,929
[45] Date of Patent: Jan. 3, 1995

[54] TRAILER ANTI-THEFT DEVICE

[75] Inventors: Yitzchak Mor, Eilat, Israel; Daniel Yuranyi, Thornhill, Canada

[73] Assignee: Mor Security & Electronics Ltd., Eilat, Israel

[21] Appl. No.: 75,961

[22] Filed: Jun. 14, 1993

[51] Int. Cl.⁶ .......................................... B60T 17/16
[52] U.S. Cl. .................................. 303/89; 188/353; 303/7; 303/DIG. 3
[58] Field of Search ............ 303/89, 7, 9, 13, DIG. 3, 303/DIG. 4; 188/353, 265, 3 R, 3 H; 180/287

[56] References Cited
U.S. PATENT DOCUMENTS 4,712,422 12/1987 Munro .
4,793,661 12/1988 Munro .
5,078,456 1/1992 Cox .......................................... 303/89

Primary Examiner—Douglas C. Butler

[57] ABSTRACT

An anti-theft device is coupled in series with a supply line and a service line of a trailer. When activated, the anti-theft device prevents theft of the trailer by decoupling the supply and service lines of the trailer from the reservoir and brake cylinders of the trailer, and by coupling the supply and service lines to the atmosphere, thereby preventing a prospective thief from releasing the trailer's brakes by restoring air to the supply and service lines. When the anti-theft device is deactivated, the supply and service lines are re-coupled to the reservoir and brake cylinders to allow the driver to release the trailer brakes.

20 Claims, 4 Drawing Sheets

TRAILER ANTI-THEFT DEVICE

FIELD OF THE INVENTION

The present invention relates to anti-theft devices, and in particular to an anti-theft device for a trailer or other vehicle which utilizes an air brake system.

BACKGROUND OF THE INVENTION

Trailer theft has become a major problem for the trucking industry. Truck drivers generally park their trailers at a loading area so that the trailers can be loaded with merchandise at a later time. In the interim, the trailers are left unattended. F.B.I. Federal Bureau of Investigation) reports for 1991 indicate that almost 100,000 trailers were stolen while parked at loading areas.

The most common method of stealing a parked trailer is for the thief to drive up to the trailer with his or her own tractor. The thief then connects the tractor to the trailer, including connecting the tractor's electrical line and air hoses to the trailer, activates the tractor's compressor to release the trailer's air brakes, and simply drives the tractor-trailer away. As a result, there is a need for an anti-theft device which can effectively prevent the theft of trailers and other vehicles which use air brakes.

SUMMARY OF THE INVENTION

The present invention provides a device which prevents the theft of trailers, tractors, or other vehicles using an air brake system by making it impossible for the thief to release the air brakes of the vehicle. In the discussion that follows, the present invention will be described in the environment of a trailer. It should be clear, however, that the present invention is equally applicable to any other vehicle which uses air brakes.

Tractor-trailers use air brakes to stop the vehicle. Both the tractor and trailer have one or more reservoirs coupled to their respective brake cylinders. The tractor comes equipped with an air compressor for supplying air pressure to the tractor-trailer's air brake system. The air compressor supplies pressure to the reservoir(s) and to each brake chamber in each brake cylinder via a supply line and a service line.

When a driver couples a tractor to a trailer, she attaches an electrical line, the supply line, and the service line from the tractor to the trailer. The driver then activates the compressor in the tractor to fill the supply and service lines, and therefore the trailer's reservoir and the trailer's brake cylinders, to a predetermined pressure. Under normal operation, the tractor's compressor maintains a predetermined air pressure in the brake chambers of the brake cylinders (via the supply and service lines) which is sufficient to maintain the brakes in a released state. When the driver depresses the brake pedal, pressure is released from the brake system via a decompression in the service line. As a result of the loss in air pressure, the brakes are applied and the trailer will slow down or come to a halt depending upon the amount of pressure released from the brake system. When the brake pedal is released, air pressure is restored in the service line and the brakes are released.

When the driver disconnects the tractor from the trailer, she decompresses both the service and supply lines via a switch in the tractor cabin and then removes the electrical, supply, and service lines from the trailer. The decompression of the supply and service lines causes the air pressure in the brake chambers and reservoir to immediately drop, thereby applying the brakes and immobilizing the trailer until air pressure is reapplied.

The present invention provides a trailer anti-theft device which takes advantage of a trailer's air brake system. In accordance with the present invention, an anti-theft device, which includes a controller air valve, is mounted on the trailer and coupled in series with the service and supply lines of the trailer. The controller air valve includes a service line input coupled to the incoming service line from the tractor, a service line output coupled to an outgoing service line to the trailer brakes, a supply line input coupled to the incoming supply line from the tractor, a supply line output coupled to an outgoing supply line to the trailer reservoir, and an atmosphere output leading to the atmosphere. When the alarm system is activated, the controller air valve couples the supply line input and the service line input to the atmosphere output thereby preventing anyone from releasing the brakes by restoring pressure to the trailer's reservoir and brake chambers. When the alarm system is deactivated, the supply line input is coupled to the supply line output and the service line input is coupled to the service line output thereby returning the trailer's brake system to its initial state and allowing the driver to release the trailer's brakes by restoring pressure to the trailer's reservoir and brake chambers via the supply and service lines.

In accordance with the present invention, the tractor alarm system can be activated in several ways. It can be manually activated using, for example, a remote control transmitter and receiver or a hardwired switch located somewhere in the trailer.

In an embodiment of the present invention, a pressure sensor is provided which will automatically activate the alarm system whenever the supply line is decompressed. The pressure sensor is mounted on the supply line between the supply line output of the controller air valve and the trailer reservoir. The sensor monitors the pressure in the supply line and activates the alarm system when the pressure in the supply line drops below a predetermined level.

The manner in which the anti-theft device according to the present invention operates to prevent trailer theft will now be discussed. After the driver parks the tractor, the air compressor in the tractor is shut off and the trailer's brake chambers are decompressed as usual. After stabilizing the trailer parking legs, the driver activates the alarm unit utilizing the remote control (or other triggering device, e.g. a switch). This causes the controller air valve to decouple the supply and service line inputs from the supply and service line outputs, respectively, and to couple the supply and service line inputs to the atmosphere output. At this point the alarm is set. The driver then disconnects the electrical, supply, and service lines from the trailer and disengages the tractor from the trailer.

Once the alarm is set, the trailer cannot be moved without deactivating the alarm. Since there is no pressure in the trailer reservoir or brake chambers, the trailer brakes are engaged. Any attempt to disengage the brakes by supplying pressure to the reservoir and brake chambers via the supply and service lines will be ineffective because the supply and service lines will not be coupled to the reservoir or to the brake chambers, but instead will lead merely to the atmosphere through the atmosphere output.

If the driver forgets to manually activate the alarm by using the remote control (or switch), the alarm will, in an embodiment of the present invention, activate itself automatically when the trailer brakes are decompressed. As soon as the pressure sensor detects that the pressure in the supply line has dropped below a predetermined level, the controller air valve will decouple the supply and service line inputs from the supply and service line outputs, and couple the supply and service line inputs to the atmosphere output, thereby activating the alarm system.

In accordance with an embodiment of the present invention, the anti-theft device contains no internal power source. It is powered only from the electrical line from the tractor. Therefore, once the alarm is set and the electrical line removed, the system is irrevocably engaged until power is reapplied.

In accordance with another embodiment of the present invention, an alarm siren is coupled to the alarm system. Once the alarm system is engaged, the siren will sound until 1) the electrical line is disengaged, or 2) the alarm is disengaged via the remote control or switch.

When the driver returns and wishes to move the trailer, she simply connects the tractor to the trailer, connects the tractor's electrical line to the trailer (thereby powering the alarm system) and deactivates the alarm using either the remote control or switch. Upon receipt of the deactivation signal, the controller air valve will decouple the service and supply line inputs from the atmosphere output and couple the service and supply line inputs to the service and supply line outputs, respectively. The driver then couples the supply and service lines to the tractor and turns on the tractor's compressor to pressurize the brake system.

In accordance with a further embodiment of the present invention, the pressure sensor monitors the pressure in the supply line and disables the remote control (or switch) when the pressure rises above a predetermined level. This feature prevents the brakes from locking as a result of an accidental activation of the alarm system during tractor-trailer operation.

DETAILED DESCRIPTION

Figure 1:
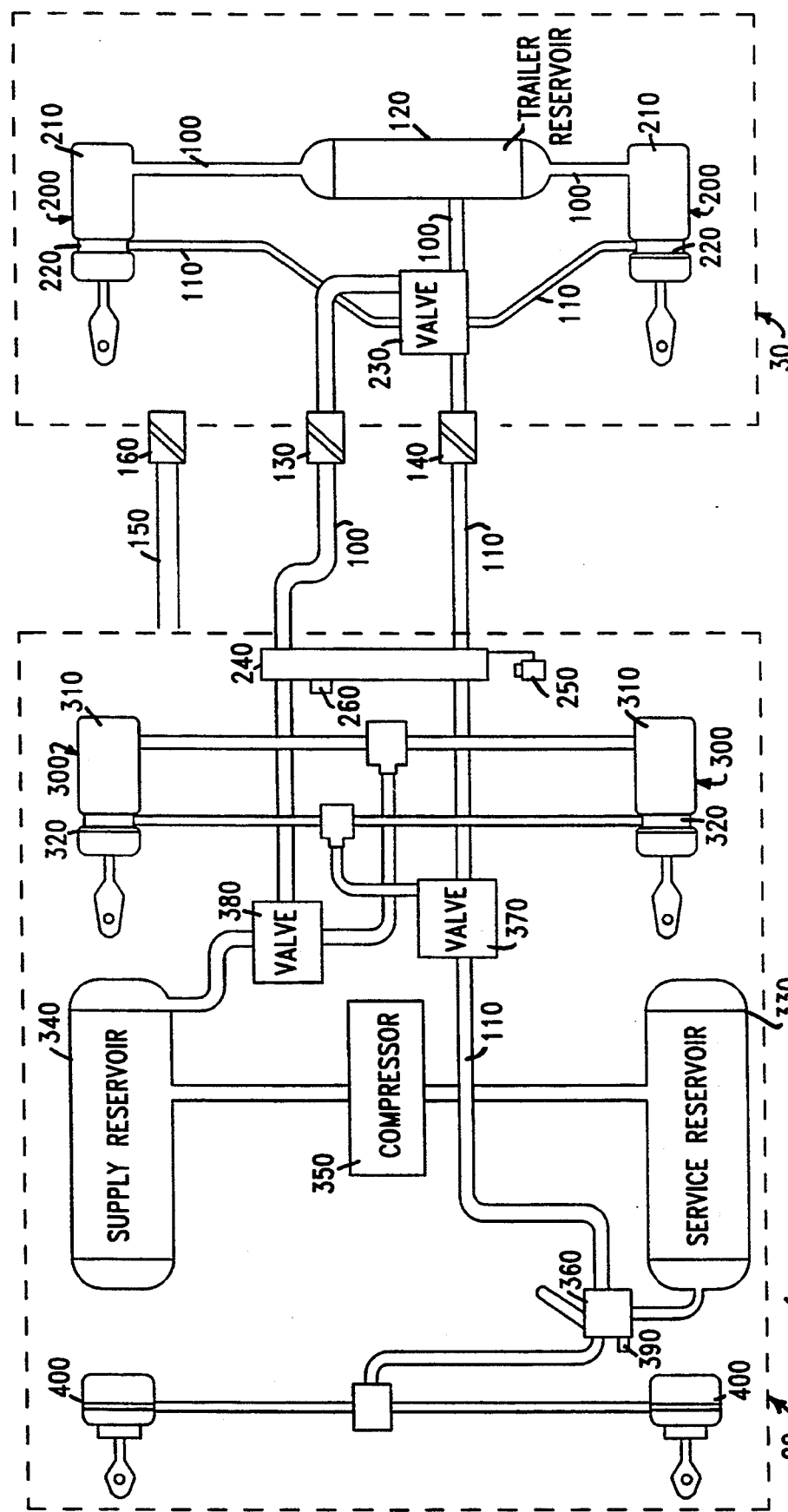
FIG. 1 is a block diagram of a tractor-trailer air brake system.

The operation of a typical air brake system of a tractor-trailer will be explained with reference to FIG. 1. FIG. 1 shows a simplified air brake system of a tractor-trailer 10. The tractor-trailer includes a tractor 20 and a trailer 30. The tractor is coupled to the trailer via an electrical line 150, a supply line 100, and a service line 110. To allow the service, supply, and electrical lines to be quickly coupled and decoupled, a service line coupling 140, a supply line coupling 130, and an electrical line coupling 160 are provided.

In the trailer 30, the service line 110 is coupled, via a valve 230, to a first chamber 220 of each brake cylinder 200. The supply line 100 is coupled to a second chamber 210 of each brake cylinder 200 via the valve 230 and a trailer reservoir 120.

In the tractor 20, the service line 110 is coupled, via a valve 240 and a valve 370, to a brake pedal-valve 360 which, in turn, is coupled to a service reservoir 330. The supply line 100 is coupled to a supply reservoir 340 through the valve 240 and a valve 380. Air to the brake system is supplied by a compressor 350 which is coupled to both the supply reservoir 340 and the service reservoir 330. The tractor 20 includes a pair of front brake cylinders 400 which are coupled to the service reservoir 330 through the brake pedal-valve 360. The supply line 100 and service line 110 are also coupled to a first and second chamber 320, 310 of each rear tractor brake cylinder 300 via valves 370, 380.

In the cabin of the tractor 20, a trailer-decompression button 250 is provided. When this button is pressed, the valve 240 releases air pressure via an output 260 from both the supply and service lines in the trailer 30. This releases the air pressure from the first and second chambers 210, 220 of the brake cylinders 200 and from the trailer reservoir 120. A similar button (not shown) can be used to release the air from the supply and service lines in the tractor 20.

The compressor 350 maintains pressure in the supply reservoir 340. This, in turn, keeps a predetermined pressure on the second chamber 310 of the tractor brake cylinders 300, the trailer reservoir 120, and the second chamber 210 of the trailer brake cylinders 200. The compressor 350 also maintains pressure in the service reservoir 330. When the brake pedal-valve 360 is not depressed, pressure is maintained, through the service reservoir 330, on the first chamber 320 of the tractor brake cylinders 300 and on the first chamber 220 of the trailer brake cylinders 200. When the brake pedal-valve 360 is depressed (i.e. the driver applies the brakes), the pressure from the service reservoir 330 is blocked, and the pressure in the service line 110 is released to the atmosphere via an output 390 of the brake pedal-valve 360.

When there is pressure in both the service line 110 and the supply line 100 in the trailer 30, pressure is maintained in both the first and second chambers (220, 210) of the brake cylinders 200 and the brakes are in a released state (i.e. brakes are not applied). When pressure is released from the first chamber 220 via a depression of the brake pedal-valve 360, the brakes are applied. When the pressure in the first chamber 220 drops below a predetermined level, air from the second chamber 210 flows into the first chamber 220. When the brake pedal-valve 360 is depressed, the air which flows from the second chamber 210 to the first chamber 220 simply exits to the atmosphere from the output 390 of the brake pedal-valve 360. However, when the brake pedal-valve 360 is released, pressure is restored in the first chamber 220 via both the service reservoir 330 and the second chamber 210 thereby releasing the brakes.

When the button 250 is depressed, the valve 240 releases the pressure from both the service line 110 and the supply line 100 into the atmosphere via output 260. Therefore, pressure is released from the trailer reservoir 120, the second chamber 210, and the first chamber 220. As a result, the trailer brakes are applied and the trailer is immobilized.

Figure 2A:
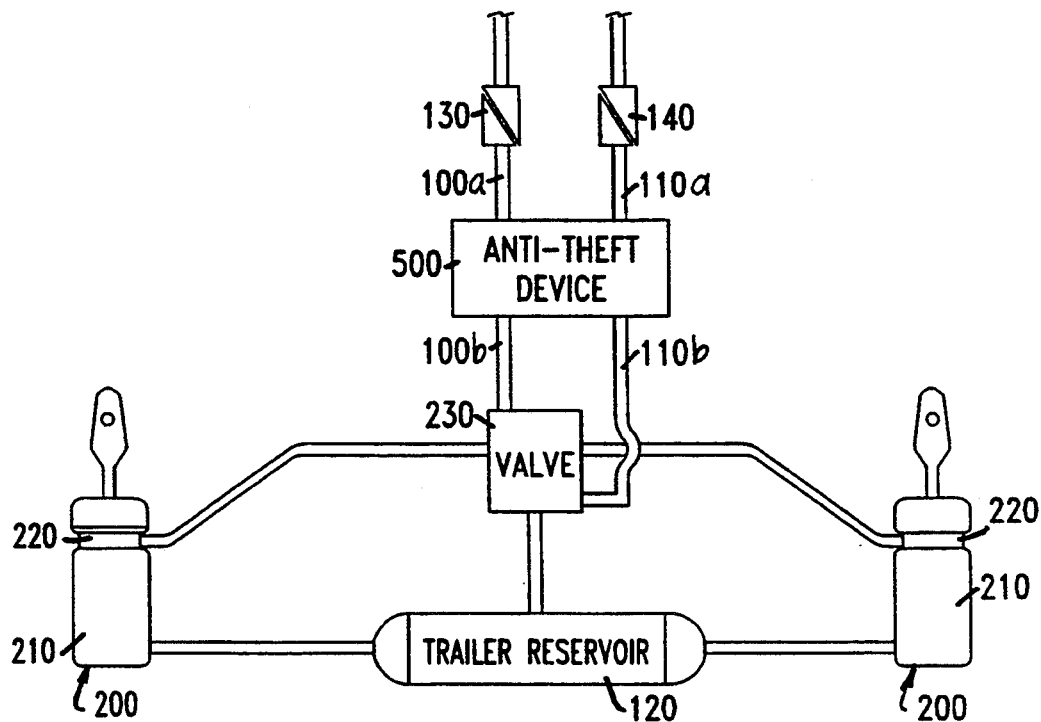
FIGS. 2(a) and 2(b) shows two exemplary techniques for incorporating the present invention into the air brake system of FIG. 1.
Figure 2B:
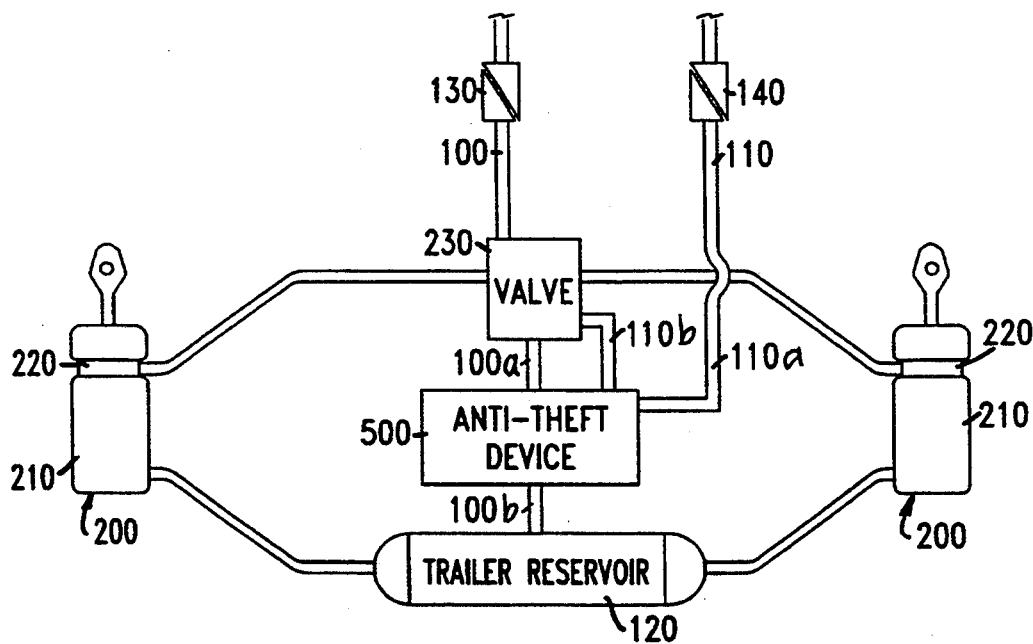

FIGS. 2(a) and 2(b) show two exemplary techniques for incorporating an anti-theft device 500 according to the present invention into the trailer brake system of FIG. 1. FIG. 2(a) shows the anti-theft device 500 mounted between the service and supply line couplings and the valve 230 and FIG. 2(b) shows the anti-theft device 500 mounted between the valve 230 and the trailer reservoir 120. Identical components are shown with like reference numerals in FIGS. 2(a) and 2(b).

Figure 3:
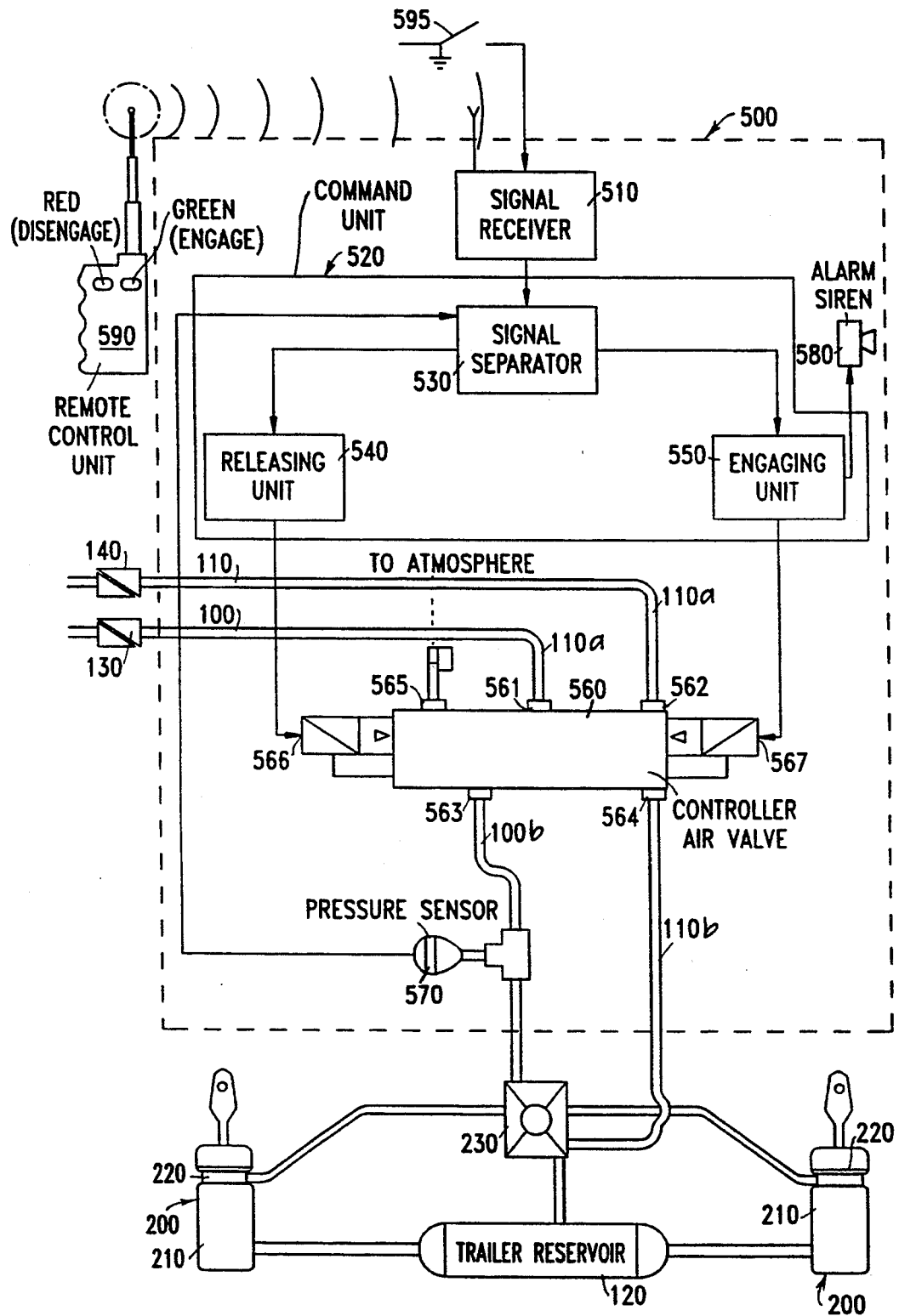
FIG. 3 shows an embodiment of the anti-theft device according to the present invention.

FIG. 3 shows an embodiment of the anti-theft device 500 according to the present invention in greater detail. A remote control unit 590 is used to activate or deactivate the anti-theft device 500. After the driver has decompressed the trailer brake system by activating the trailer decompression valve 240, the alarm system can be activated by pressing a button on the remote control unit 590. The activate signal from the remote control unit 590 is received by a signal receiver 510 in the anti-theft device 500. While the present invention will be described as controlled by a remote control unit, it should be clear that any type of triggering device could be used to activate or deactivate the system including, for example a switch 595.

In any case, the received signal is input to a command unit 520 which identifies the signal as either a signal to engage the anti-theft device or a signal to disengage the anti-theft device, and sends an appropriate command to a controller air valve 560.

The controller air valve 560 is coupled in series with the service and supply lines of the trailer. It has a service line input 562 coupled to an incoming service line 110a, a supply line input 561 coupled to an incoming supply line 100a, a service line output 564 coupled to an outgoing service line 110b, a supply line output 563 coupled to an outgoing supply line 100b, an atmosphere output 565 coupled to the atmosphere, and control lines 566, 567 coupled to the command unit 520.

When a signal to activate the alarm system is received, the command unit 520 sends a command over one or more of the control lines 566, 567, instructing the controller air valve 560 to couple the service line input 562 and the supply line input 561 to the atmosphere output 565, via, for example, valves or switches inside the controller air valve 560. Alternatively, the controller air valve 560 could be configured to couple the supply and service line outputs 100b, 110b to the atmosphere output 565 upon receipt of a signal to engage the alarm system. In either case, the path from the incoming service and supply lines to the brake cylinders 200 and reservoir 120 is broken. When a signal to deactivate the alarm system is received, the command unit 520 sends a command over one or more of the control lines 566, 567 instructing the controller air valve 560 to couple the service line input 562 to the service line output 564 and the supply line input 561 to the supply line output 563, thereby re-establishing a path between the incoming service and supply lines, on one end, and the brake cylinders 200 and the reservoir 120, on the other end.

In accordance with an exemplary embodiment of the present invention, an alarm siren 580 is coupled to the command unit 520. When the command unit receives a command to engage the alarm system, the alarm siren 580 sounds. The alarm will continue to sound until the driver disconnects the electrical line 150 from the trailer. Once the electrical line 150 is disconnected, power to the anti-theft device is lost and the alarm siren 580 will shut off. When the driver (or a thief) connects the electrical line 150 to the trailer, the alarm siren 580 will sound again because the anti-theft device is still activated. In order to stop the alarm siren 580 while the electrical line 150 is connected to the trailer, the driver deactivates the alarm by sending a disengage signal to the command unit 520 from the remote control 590 (or another triggering device, e.g. a switch).

In accordance with a further embodiment of the present invention, a pressure sensor 570 is coupled to the outgoing supply line 100b and to the command unit 520. When the pressure sensor 570 senses that the pressure in the supply line 570 has dropped below a predetermined level, the pressure sensor 570 will send a signal to the command unit 520 instructing the command unit 520 to engage the anti-theft device. As a result, the anti-theft device will be automatically engaged once the driver has decompressed the supply line 100 of the trailer 30.

In accordance with the present invention, the pressure sensor 570 also provides a safety feature which insures that the anti-theft device cannot be accidentally activated or deactivated. When the pressure sensor 570 senses that the pressure in the supply line is above a predetermined level, it sends a signal to the command unit 520 instructing the command unit 520 to disregard any signal from the remote control unit 590 (or other triggering device, e.g. the switch 595). As a result, if the driver accidentally presses a button on the remote control unit 590 while the tractor trailer is in operation, the brakes of the trailer 30 will not be accidentally engaged.

Two illustrative embodiments of the command unit 520 will now be discussed. In accordance with the embodiment of the present invention shown in FIG. 4, the driver pushes a button on a remote control unit 690 to activate the alarm system and then presses the same button again to deactivate the alarm system. In this system, the command unit 520 includes a single control unit 600. At any particular time, the control unit 600 is either in an armed (engaged) or unarmed (disengaged) state. When the control unit 600 receives a signal from the signal receiver 510, it toggles from its present state to the other state. If the control unit 600 receives a signal while the system is engaged it will disarm the system. If it receives a signal while the system is disengaged, it will arm the system.

Figure 4:
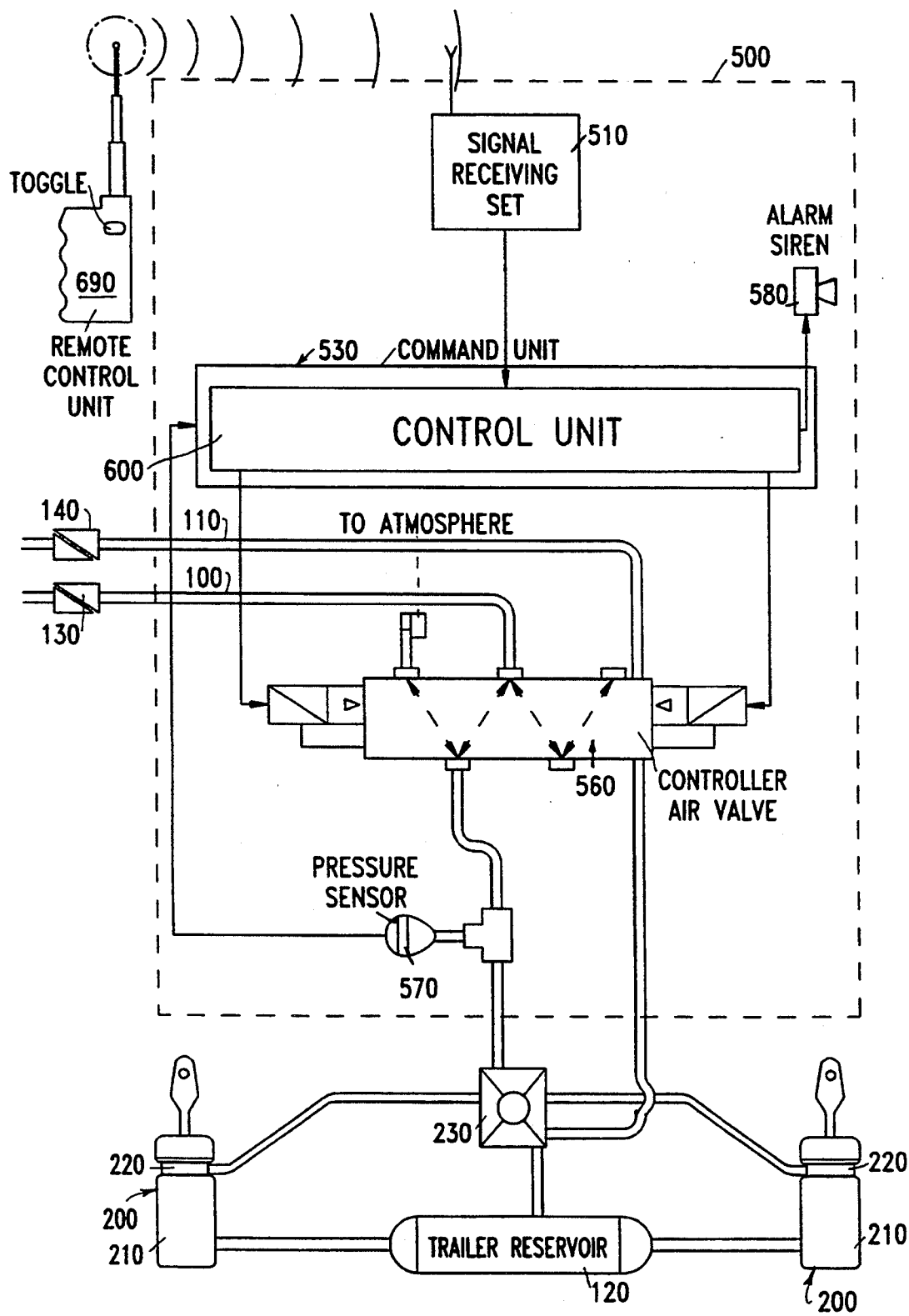
FIG. 4 shows another embodiment of the anti-theft device according to the present invention.

A second embodiment of the command unit 520, shown in FIG. 3, provides additional safety features not present in the embodiment of FIG. 4. In accordance with this exemplary embodiment of the present invention, the command unit 520 includes a signal separator 530, a releasing unit 540, and an engaging unit 550. Moreover, the remote control unit 590 transmits two distinct signals: one to engage the system and one to disengage the system. The signal from the remote control unit 590 is received by the signal receiver 510 and input into the signal separator 530 of the command unit 520.

The signal separator 530 determines whether the received signal is an engage signal or a disengage signal and outputs engage signals to the engaging unit 550 and outputs disengage signals to the releasing unit 540. Upon receipt of an engage signal, the engaging unit 550 engages the controller air valve 560 via the control line 567 thereby coupling the incoming supply and service lines 100a, 110a to the atmosphere output 567. Upon receipt of a disengage signal, the releasing unit 540 disengages the controller air valve 560 via the control line 566 thereby coupling the supply and service line inputs 100a, 110a to the supply and service line outputs 100b, 110b.

By isolating the engaging and disengaging circuitry of the anti-theft device 500, the chance of the driver accidentally engaging or disengaging the system is greatly reduced. Therefore, the configuration of FIG. 3, for example, provides more safety than the "toggle" embodiment of FIG. 4. In accordance with the embodiment of FIG. 4, if the driver accidentally presses the button on the remote control unit twice while attempting to engage (or disengage) the system, the control unit 600 will toggle from unarmed→armed→unarmed (or from armed→unarmed→armed). In contrast, if the driver pushes the engage (or disengage) button on the remote control unit 590 twice, the system will be armed and remain armed (or disarmed) because of the signal isolation provided by the remote control unit 590, signal separator 530, releasing unit 540, and engaging unit 550.

What is claimed is:

1. An anti-theft device for use with a vehicle having an air brake system, the anti-theft device comprising:
   a command unit for receiving a signal from a triggering device and for outputting one of a first and a second command in response to receipt of the signal;
   a controller having an input coupled to the command unit for receiving the one of the first and the second command from the command unit, the controller for coupling in series with a service line of the vehicle, the controller having a service line input and a service line output, the controller coupling the service line input to the service line output when the second command from the command unit is received, the controller decoupling the service line input from the service line output when the first command from the command unit is received.

2. The anti-theft device according to claim 1, wherein the controller is a controller air valve.

3. The anti-theft device according to claim 1, further comprising an alarm coupled to the command unit, the command unit activating the alarm upon issuance of the first command and deactivating the alarm upon issuance of the second command.

4. The anti-theft device according to claim 1, wherein the controller is for coupling in series with the service line and a supply line of the vehicle, the controller having a supply line input and a supply line output, the controller coupling the supply line input to the supply line output when the second command from the command unit is received, the controller decoupling the supply line input from the supply line output when the first command from the command unit is received.

5. The anti-theft device according to claim 4, wherein the controller further includes an atmosphere output, the controller coupling the service line input and the supply line input to the atmosphere output when the first command from the command unit is received.

6. The anti-theft device according to claim 4, further comprising a pressure sensor having an output coupled to the command unit, the pressure sensor for coupling to the supply line of the vehicle between the controller and a reservoir of the vehicle, and for sensing a pressure level in the supply line and instructing the command unit to output the first command when the pressure level is below a first preselected value.

7. The anti-theft device according to claim 6, wherein the pressure sensor instructs the command unit to not output the first or the second command when the pressure sensor senses that the pressure level is above a second preselected value.

8. The anti-theft device according to claim 1, wherein the triggering device is a switch.

9. The anti-theft device according to claim 1, wherein the triggering device is a remote control unit.

10. The anti-theft device according to claim 9, wherein the remote control unit transmits signals including a first signal to engage the anti-theft device and a second signal to disengage the anti-theft device.

11. The anti-theft device according to claim 10, wherein the command unit further includes a signal receiver coupled to an engaging unit and a disengaging unit, the signal receiver receiving signals from the remote control unit and sending any first signals to the engaging unit and sending any second signals to the disengaging unit, the engaging unit sending the first command to the controller when the first signal is received from the signal receiver, the disengaging unit sending the second command to the controller when the second signal is received from the signal receiver.

12. The anti-theft device according to claim 1, wherein the anti-theft device has a power supply input for receiving operating power from a power source of the vehicle.

13. An anti-theft device for use with a trailer having an air brake system, the anti-theft device comprising:
   a command unit for receiving a signal from a triggering device and for outputting one of a first and a second command in response to receipt of the signal;
   a controller air valve having an input coupled to the command unit for receiving the one of the first and the second command from the command unit, the controller air valve for coupling in series with a supply line of the trailer and a service line of the trailer, the controller air valve having a service line input, a supply line input, a service line output, and a supply line output, the controller air valve coupling the service line input to the service line output and coupling the supply line input to the supply line output when the second command from the command unit is received, the controller air valve decoupling the service line input from the service line output and decoupling the supply line input from the supply line output when the first command from the command unit is received.

14. The anti-theft device according to claim 13, further comprising an alarm coupled to the command unit, the command unit activating the alarm upon issuance of the first command and deactivating the alarm upon issuance of the second command.

15. The anti-theft device according to claim 13, further comprising a pressure sensor having an output coupled to the command unit, the pressure sensor for coupling to the supply line of the trailer between the controller air valve and a reservoir of the trailer, and for sensing a pressure level in the supply line and instructing the command unit to output the first command when the pressure level is below a first preselected value.

16. The anti-theft device according to claim 15, wherein the pressure sensor instructs the command unit to not output the first or the second command when the pressure sensor senses that the pressure level is above a second preselected value.

17. The anti-theft device according to claim 13, wherein the triggering device is a remote control unit.

18. The anti-theft device according to claim 17, wherein the remote control unit transmits signals including a first signal to engage the anti-theft device and a second signal to disengage the anti-theft device.

19. The anti-theft device according to claim 18, wherein the command unit further includes a signal receiver coupled to an engaging unit and a disengaging unit, the signal receiver receiving signals from the remote control unit and sending any first signals to the engaging unit and sending any second signals to the disengaging unit, the engaging unit sending the first command to the controller air valve upon receipt of the first signal, the disengaging unit sending the second command to the controller air valve upon receipt of the second signal.

20. The anti-theft device according to claim 13, wherein the anti-theft device has a power supply input for receiving operating power from a power source on a tractor.

* * * * *